Aug. 6, 1968 H. J. BENZULY 3,396,237
HORIZONTAL SWEEP CIRCUIT
Filed Sept. 21, 1964
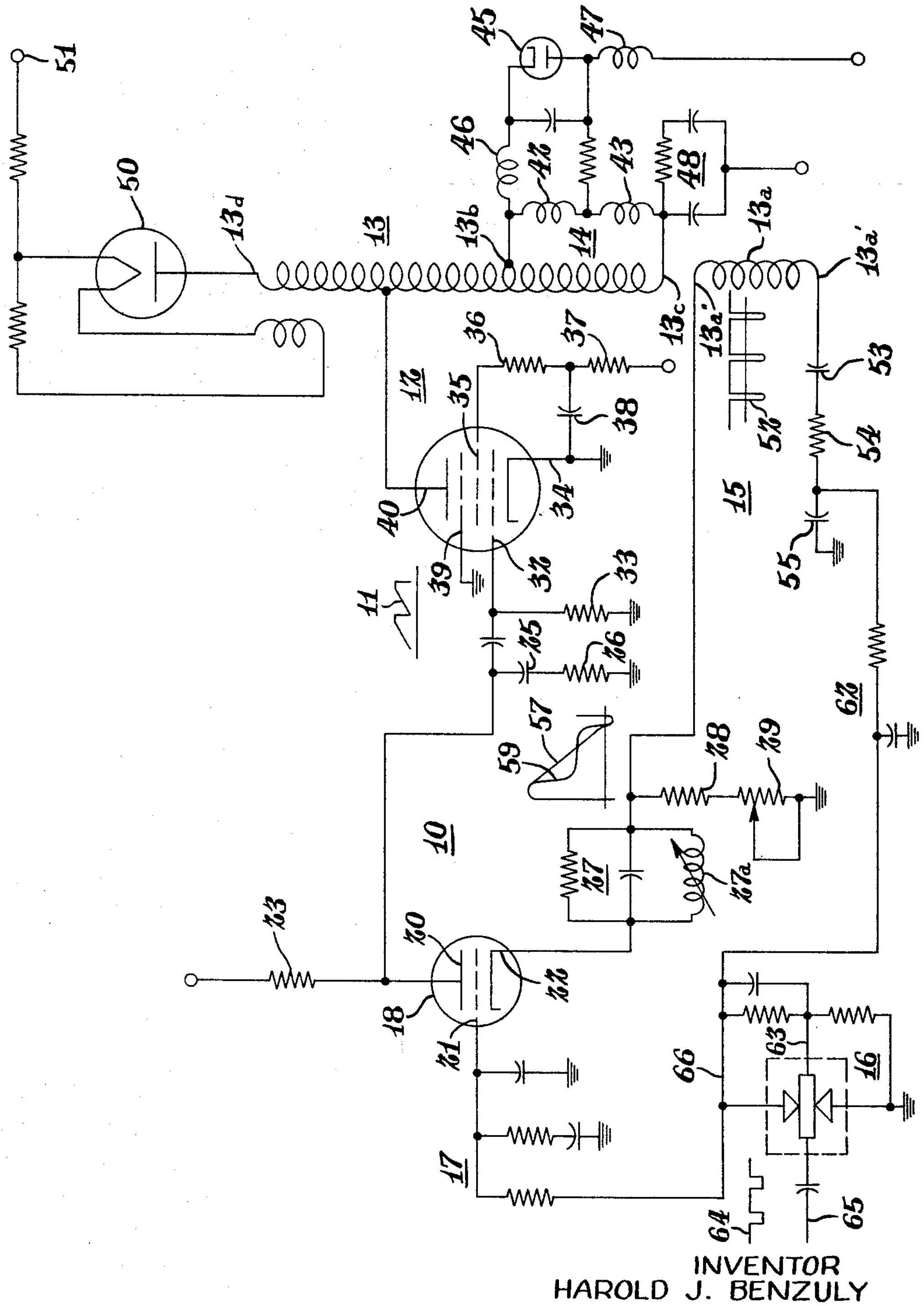
INVENTOR
HAROLD J. BENZULY
BY
Hofgren, Wegner,
Allen, Stellman & McCord
Attys.

United States Patent Office 3,396,237

Patented Aug. 6, 1968

3,396,237
HORIZONTAL SWEEP CIRCUIT

Harold J. Benzuly, Highland Park, Ill., assignor to Warwick Electronics Inc., a corporation of Delaware Filed Sept. 21, 1964, Ser. No. 397,834
11 Claims. (Cl. 178—7.3)

ABSTRACT OF THE DISCLOSURE

A horizontal sweep circuit utilizing a triode blocking oscillator and a power output stage with a feedback trigger signal from the output stage to the cathode of the oscillator. The grid of the oscillator provides a high impedance input for an AFC control.

The present invention relates to horizontal sweep circuits as for a television receiver and more particularly to a single triode horizontal sweep oscillator circuit.

In many television receiver horizontal sweep generating circuits two tubes, connected to operate as a multivibrator circuit, are utilized to generate a sawtooth wave form for controlling the current in the horizontal deflection yoke of a picture tube. Usually the sawtooth wave form which provides the horizontal sweep is produced by the interaction of the output from an output amplifier controlled by the multivibrator, a damper or efficiency diode circuit and a horizontal output transformer to which the horizontal output and the damper circuit are connected. The present invention provides a horizontal oscillator circuit which replaces the conventional multivibrator and requires only a single device in a blocking oscillator circuit, rather than the two vacuum tubes required for a multivibrator.

It is an object of the present invention to provide a new and improved horizontal oscillator circuit.

A further object is to provide a single triode horizontal oscillator circuit.

Another object is to provide a feedback circuit from a horizontal sweep output transformer, which actuates an electronic switching device to discharge an R-C circuit, wherein an output of the R-C circuit is used to produce a television horizontal output signal which is provided to the flyback transformer.

Further objects and advantages will become apparent from the following detailed description taken in connection with accompanying drawing, which is a circuit diagram of a preferred embodiment of the present invention.

While this invention is susceptible of embodiment in many different forms, there is shown in the drawing and will herein be described in detail, an embodiment of the invention with the understanding that the present disclosure is to be considered as an examplification of the principles of the invention and is not intended to limit the invention to the embodiment illustrated. The scope of the invention will be pointed out in the appended claims.

The horizontal sweep circuit illustrated in the drawing includes a blocking oscillator indicated generally as 10 which has a generally sawtooth output signal illustrated at 11 that controls operation of an output amplifier or switching device 12. A sawtooth current is developed in output transformer 13 to which the horizontal deflection coils 14 are connected. A secondary winding **13*a* coupled to the output transformer is connected with a feedback circuit 15 completing the network of blocking oscillator 10; and with a phase detector 16 in which the frequency and phase of the horizontal sweep signal is compared with that of received horizontal synchronizing pulses. The output of phase detector 16 is connected through a filter network 17** with the blocking oscillator.

The specific circuit illustrated in the drawing will now be described in detail and values will be given for the various components. It is to be understood that these specific values are given solely for the purpose of disclosing an operative embodiment of the invention and that many changes will readily be apparent to those skilled in the art.

The blocking oscillator 10 utilizes a triode amplifying device 18, one-half of a 6GH8A, having an anode output element 20 and grid and cathode control elements 21 and 22. The anode is connected through a resistor 23, 56,000 ohms, with a suitable voltage supply of several hundred volts. A first R-C charging network is connected from the anode 20 to ground and includes a capacitor 25, 270 picofarads, connected in series with a resistor 26, 1800 ohms. The cathode circuit includes a parallel resonant network 27, the purpose of which will be described later, and is returned to a reference potential or ground through resistor 28, 39,000 ohms, and a potentiometer 29, 10,000 ohms.

The sawtooth output wave 11 from the blocking oscillator 10 is coupled through capacitor 31, 0.005 microfarad, to the control grid 32 of the output amplifier 12, a 22JG6. The control grid is returned to ground through resistor 33, 270,000 ohms. Cathode 34 is grounded. Screen grid 35 is connected through dropping resistors 36 and 37, each 560 ohms, to a positive source with a decoupling capacitor 38, 20 microfarads, connected from the juncture of the two resistors to ground. The suppressor grid 39 is connected directly to ground.

Anode or output electrode 40 is connected with a tap **13*a* on the autotransformer 13 to which deflection coils 14, comprising coil portions 42 and 43, are also connected. The deflection yoke is shunted by a damper or efficiency diode 45 which has a cathode connected through RF choke 46 with the high impedance junction 13*b* between the deflection yoke and output transformer and an anode connected through choke 47 with a suitable positive supply voltage. The low impedance junction 13*c* between the deflection yoke and output transformer is connected through a boosted B+ filter network 48** with B+.

High voltage rectifier 50 is connected with the end terminal **13*d* of the output transformer and provides at terminal 51** suitable high voltage for the ultor of the display tube of the television receiver.

Secondary winding **13*a* of the output transformer has developed therein a series of pulses 52 which correspond with the retrace pulse of the horizontal sweep signal. The terminal 13*a'* of the secondary winding 13*a* is returned to ground through a second R-C integrating network including capacitor 53, 620 micromicrofarads, resistor 54, 2700 ohms, and capacitor 55, 0.0022 microfarad. As a result of the integrating action of this circuit, the voltage at terminal 13*a''* with respect to ground is a negative going sawtooth illustrated at 57. This negative going sawtooth signal is applied through the feedback network 15 to the junction between resonant circuit 27 and cathode resistor 28** of the blocking oscillator.

The operation of the embodiment of the invention shown in the drawing will now be described in detail. During the following description, it is assumed that the control grid 21 of the blocking oscillator is at zero or ground potential and that the parallel resonant stabilizing circuit 27 is shorted out. Assume further that capacitor 25 of the first R-C network is discharged, the direct current potential connected across it and resistors 23 and 26 will cause the voltage at the upper terminal of capacitor 25 to rise with a corresponding rise in the voltage applied to the control grid 32 of output tube 12. The rising grid voltage causes the tube 12 to draw a rising plate current through the primary winding of output transformer 13. As control grid 32 goes positive, it begins to draw grid current which tends to clamp it at or near zero bias producing a flat top on the grid wave form.

While the output or plate current increases, the voltage appearing across secondary winding 13*a* of the output transformer and coupled back to the cathode circuit of blocking oscillator 10 is relatively constant. As the grid of the output tube begins to clamp, the output tube plate current continues to increase, but at a slower rate. Furthermore, as the plate current increases, the knee of the plate current characteristic is approached, causing a reduction in the rate of increase and an accompanying increase in screen current. The result of these various effects is that the plate current of the pentode 12 ultimately begins to decrease and the voltage across secondary winding 13*a* changes polarity, becoming negative.

At the same time blocking oscillator triode 18 is essentially at plate current cutoff as the grid is at ground potential and the high resistance in the cathode produces a relatively high positive cathode voltage with a small cathode current. Thus, the plate resistance of the triode which shunts the timing capacitor 25 and series spiking resistor 26 is quite high.

The charging current for the integrating network (capacitors 53, 55 and resistor 54) as a result of the negative pulse in secondary winding 13*a*, flows through resistors 28 and 29 and causes the sawtooth wave form 57 to appear at the cathode 22 of the blocking oscillator. As the cathode voltage falls toward zero, the blocking oscillator comes into heavy conduction causing the discharge of timing capacitor 30. This tends to turn off the output tube 12.

The triode 18 and output pentode 12, which serves primarily as a switch, conduct a total of only about 46 microseconds out of a total sweep period of 63.5 microseconds. During the first part of the scan, the efficiency diode 45 conducts as in the usual horizontal output circuit.

The basic operating frequency of the blocking oscillator 10 may conveniently be adjusted by changing the resistance of potentiometer 29 in the cathode circuit.

The operation of the circuit may be made more stable by the addition to the cathode circuit of the blocking oscillator of the parallel resonant network 27. If the resonant frequency of this network is that of the desired frequency of operation of the blocking oscillator, a sine wave 59 is superimposed on the sawtooth 57. This sharpens the slope of the sawtooth in the vicinity of the point at which conduction starts so that the transition from nonconduction to heavily conducting occurs more rapidly.

A portion of the sawtooth signal appearing across capacitor 55 is coupled through a further integrator 62 and provides an input to phase detector 16. Negative synchronizing pulses 64 are coupled to input 65 of the phase detector. An output signal from the phase detector is obtained at 66 and connected through filter network 17 with the control grid of the blocking oscillator. This signal, essentially direct current in nature, has a polarity and amplitude which is a function of any discrepancy between the frequency or phase of the oscillator signal and the incoming synchronizing signals. The control grid of the triode provides a relatively high impedance input to which this control signal is applied. A variation of the control grid voltage changes the point at which the tube comes into conduction and thus controls the phase and frequency of its operation.

A recommended adjustment procedure for the frequency of the horizontal oscillator circuit is to short the parallel resonant network 27 and to adjust potentiometer 29 until the oscillator operates at the desired frequency with no synchronizing signal input to the phase detector. The short across the parallel resonant circuit 27 is removed and inductor 27*a* adjusted to return the circuit to the desired frequency. (The inductor adjustment may serve as a "Horizontal Hold" control in place of potentiometer 29.)

It is not necessary that the feedback signal be applied to the cathode and the automatic frequency control signal to the control grid of the blocking oscillator. These connections may be reversed if suitable attention is paid to the polarity of the signals involved and the impedance levels of the coupling networks.

I claim:

1. A horizontal sweep circuit for a television receiver, comprising: a control device having first and second control elements and an output element; switch means connected with the output element of said control device and operable between conductive and nonconductive conditions by the output signals from the control device; a load circuit including the horizontal deflection coil for a television receiver connected with said switch means; feedback trigger circuit means connected between said load circuit and one control element of said control device; a source of sweep synchronizing signals; a phase detector having input and output elements; means connecting said load circuit and the source of synchronizing signals with the phase detector input; and means connecting the output of said phase detector with the other control element of said control device.

2. A horizontal sweep circuit for a television receiver, comprising: a control device having first and second control elements and an output element: switch means connected with the output element of said control device and operable between conductive and nonconductive conditions by the output signal from the control device; a reactive network connected with the output element of said control device; a load circuit including the horizontal deflection coil for a television receiver connected with said switch means; feedback trigger circuit means connected between said load circuit and one control element of said control device, said control device operating as a blocking oscillator; a source of sweep synchronizing signals; a phase detector having input and output elements; means connecting said load circuit and the source of synchronizing signal with the phase detector input; and means connecting the output of said phase detector with the other control element of said control device.

3. A horizontal sweep circuit for a television receiver, comprising: a control device having first and second control elements and an output element; switch means connected with the output element of said control device and operable between conductive and nonconductive conditions by the output signal from the control device; a load circuit including the horizontal deflection coil for a television receiver connected with said switch means; feedback trigger circuit means, including signal shaping means connected between said load circuit and one control element of said control device; a source of sweep synchronizing signals; a phase detector having input and output elements; means connecting said load circuit and the source of synchronizing signal with the phase detector input; and means connecting the output of said phase detector with the other control element of said control device.

4. The horizontal sweep circuit of claim 3 wherein said shaping network is a parallel resonant circuit tuned to a frequency which is a harmonic of the frequency of said blocking oscillator.

5. A horizontal sweep circuit for a television receiver, comprising: a control device having first and second control elements and an output element; switch means connected with the output element of said control device and operable between conductive and nonconductive conditions by the output signal from the control device; a load circuit including the horizontal deflection coil for a television receiver connected with said switch means; a feedback trigger circuit including wave shaping means connected between said load circuit and one control element of said control device; and a source of phase control signal connected with the other control element of said control device.

6. A horizontal sweep circuit for a television receiver, comprising: a control device having first and second control elements and an output element; switch means connected with the output element of said control device and operable between conductive and nonconductive conditions by the output signal from the control device; a load circuit including the horizontal deflection coil for a television receiver connected with said switch means; a feedback trigger circuit means connected between said load circuit and one control element of said control device; a source of sweep synchronizing signal; a phase detector having first and second input elements and an output element; means connecting said load circuit with one of the phase detector input elements; means connecting the source of synchronizing signals with the other phase detector input; and means connecting the output of said phase detector with the other control element of said control device.

7. The sweep circuit of claim 6 including an integrating network connected between said output circuit and said one input of said phase detector.

8. A horizontal sweep oscillator circuit for a television receiver, comprising: a first R-C circuit including a first resistance and a first capacitor adapted to be connected across a direct current source of electrical potential; an electronic amplifying device having a pair of terminals and a control element, said terminals being connected across said capacitor to discharge it when conduction occurs between said terminals; a horizontal yoke driving device having an auxiliary pulse output; a second R-C circuit coupled to said auxiliary output to produce a sawtooth voltage from the pulse frequency appearing in said yoke driving device; a parallel resonant frequency stability circuit connecting said second R-C circuit to one of said terminals to provide a modified sawtooth voltage thereto which is synchronized with the sawtooth voltage produced in said second R-C circuit; means for providing synchronizing information coupled to said control element; and switching means connected to the other of said terminals and said yoke driving device to provide an output horizontal signal to said yoke driving device.

9. A horizontal sweep oscillator circuit for a television receiver, comprising: a first R-C circuit including a first resistance and a first capacitor adapted to be connected across a direct current source of electrical potential; a vacuum tube having an anode, a control grid and a cathode, said anode and cathode being connected to discharge said first capacitor when the tube conducts; a horizontal output transformer having a primary winding and a secondary winding; a second R-C circuit coupled to the secondary winding of said transformer and to said cathode to provide a sawtooth voltage to said cathode which is synchronized with a pulse frequency appearing across said transformer primary winding; means for providing synchronizing information coupled to said control grid; and means connected to said anode and said transformer primary winding to provide an output horizontal signal to said primary winding which is controlled by the conduction periods of said tube.

10. A horizontal sweep oscillator circuit for a television receiver, comprising: a first R-C circuit including a first resistance and a first capacitor adapted to be connected across a direct current source of electrical potential; a vacuum tube having an anode, a control grid and a cathode, said anode and cathode being connected to discharge said first capacitor when the tube conducts; a horizontal output transformer having a primary winding and a secondary winding; a second R-C circuit coupled to said transformer to produce a sawtooth voltage which is synchronized with a pulse frequency appearing across said transformer primary winding; a parallel resonant frequency stability circuit connecting said second R-C circuit to said cathode to provide a modified sawtooth voltage to said cathode synchronized with the sawtooth voltage produced in said second R-C circuit; means for providing synchronizing information connected between said control grid and said cathode; and means connected to said anode and said flyback transformer primary winding to provide an output horizontal signal to said primary winding which is controlled by the conduction periods of the tube.

11. A horizontal sweep oscillator circuit for a television receiver, comprising: a first R-C circuit including a first resistance and a first capacitor adapted to be connected across a direct current source of electrical potential; a second resistance; a vacuum tube having an anode, a control grid and a cathode, said anode and cathode being connected in series with said second resistance across said capacitor; a horizontal output transformer having a primary winding and a secondary winding; a second capacitor connected in series with said secondary winding across said second resistance to form a second R-C circuit with said second resistance; means for providing synchronizing information connected between said control grid and said cathode; and means connected to said anode and said transformer primary winding to provide an output horizontal signal to said primary winding which is controlled by the conduction periods of the tube.

References Cited

UNITED STATES PATENTS 3,054,020 9/1962 Cope ---------------- 315—27

ROBERT L. GRIFFIN, *Primary Examiner.*

R. L. RICHARDSON, *Assistant Examiner.*